J. McCURDY.
Carriage-Springs.
No. 151,495.  Patented June 2, 1874.
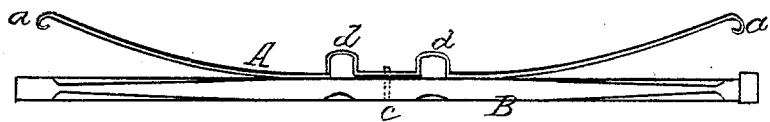
Witnesses
N.K. Du Hamel
Thomas Byrne
Inventor
John McCurdy
Geo H. S. Abbot
Attorney

UNITED STATES PATENT OFFICE.

JOHN McCURDY, OF SMICKSBURG, PENNSYLVANIA.

IMPROVEMENT IN CARRIAGE-SPRINGS.

Specification forming part of Letters Patent No. 151,495, dated June 2, 1874; application filed November 17, 1873.

*To all whom it may concern:*

Be it known that I, JOHN McCURDY, of Smicksburg, county of Indiana and State of Pennsylvania, have invented certain new and useful Improvements in Springs for Vehicles, of which the following is a specification:

My invention relates to certain improvements in springs for buggies and other vehicles; and it consists in a flat spring having two curves or bends midway of its length, one on each side of the point of attachment, for the purpose of allowing the ends of the spring to rise and fall in strictly vertical lines.

The accompanying drawing represents my improved spring as applied to an axle or reach of a vehicle.

A represents the spring, having its ends formed into eyes *a a* for attachment to the body of the vehicle. Midway of its length the spring is attached to the axle or reach B by a bolt, *c*. On each side of the point *c* the spring is bent upward, then outward, then downward, and then outward, so as to form two semicircular or semi-elliptical curves, *d d*, as shown.

The outer portions of the spring are curved upward after the manner of an ordinary semi-elliptical spring, and attached to the body of the vehicle, by the eyes *a a*, in any suitable manner. The result of forming the spring with the curves *d d* is, that as the ends are pressed down by the weight of the vehicle, they describe strictly vertical lines in consequence of the yielding of the spring at those curves, so that in attaching the ends to the body of the vehicle it is not necessary to use links or loops, as is the case with the ordinary semi-elliptical spring, where the ends are forced outward by the downward pressure.

I claim as new and desire to secure by Letters Patent—

The spring A, having the curves *d d*, as shown and described, for the purpose specified.

In testimony that I claim the foregoing as my invention I hereunto affix my signature.

JOHN McCURDY.

Witnesses:
CORNELIUS LOWE,
FRANCIS ELKIN.